W. V. TURNER.
FLUID PRESSURE BRAKE DEVICE.
APPLICATION FILED DEC. 30, 1916.
1,280,334.
Patented Oct. 1, 1918.
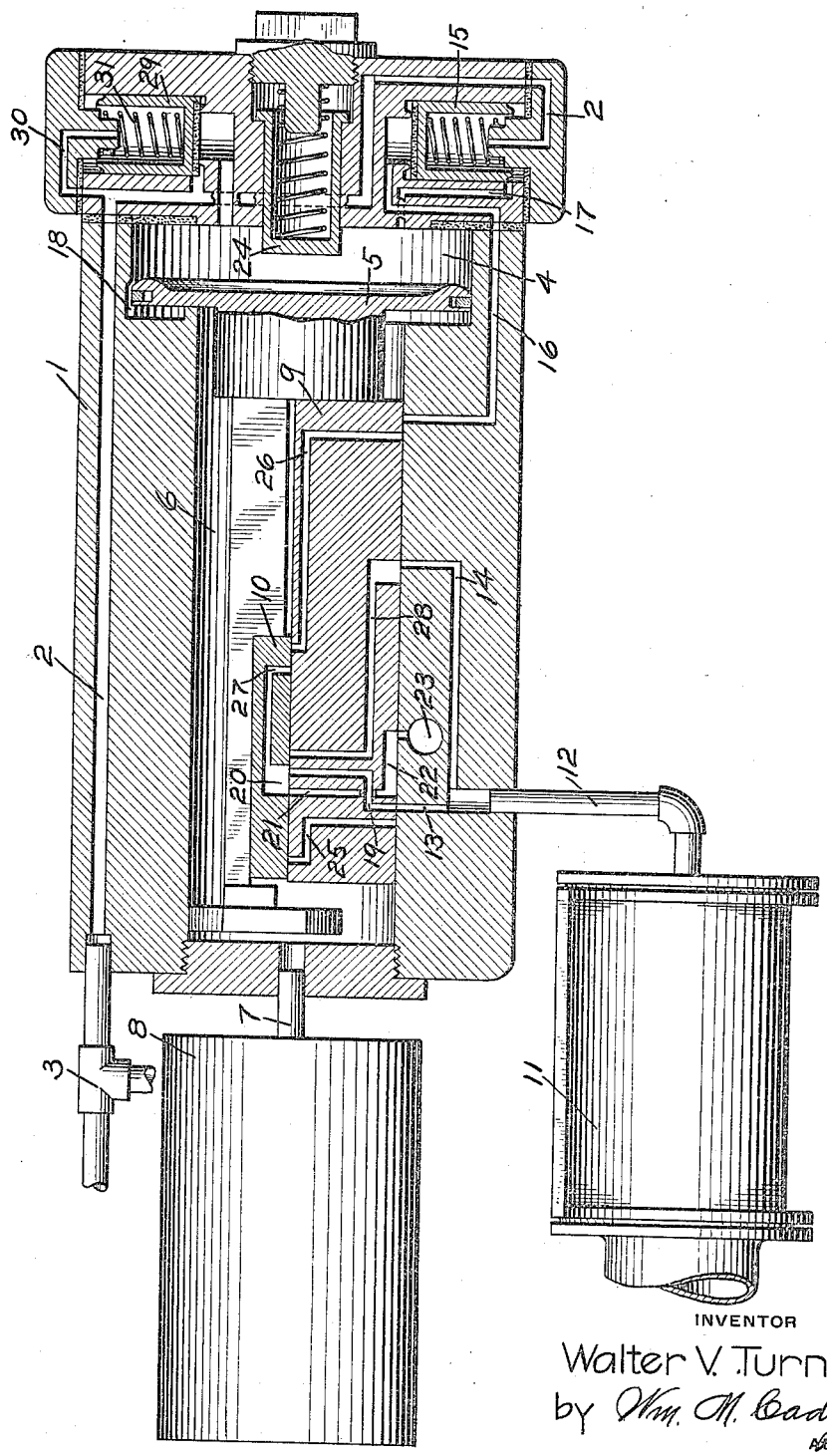
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE DEVICE.

1,280,334. Specification of Letters Patent. Patented Oct. 1, 1918.

Application filed December 30, 1916. Serial No. 139,765.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brake Devices, of which the following is a specification.

This invention relates to fluid pressure brakes, and more particularly to a triple valve device.

With the usual standard triple valve device, fluid is supplied from the auxiliary reservoir to the brake cylinder upon gradual reductions in brake pipe pressure and when the auxiliary reservoir pressure has equalized into the brake cylinder, any further gradual reduction in brake pipe pressure will cause the movement of the triple valve parts to emergency position, since the auxiliary reservoir pressure is not further reduced by flow to the brake cylinder.

Such action may not be desirable, particularly if the triple valve is of the type in which a higher brake cylinder pressure is obtained in an emergency application of the brakes than in service. On the other hand, it is highly desirable to secure quick serial action of the triple valve devices throughout the train in an emergency application of the brakes.

The principal object of my invention is to provide improved means for preventing movement of the triple valve parts to emergency position under gradual reductions in brake pipe pressure and to insure quick serial action in emergency.

In the accompanying drawing, the single figure is a diagrammatic view of a car brake equipment, showing the triple valve device in section, and embodying my improvement.

As shown in the drawing, a triple valve device 1 may be provided having a passage 2 connected to brake pipe 3, a piston chamber 4 containing piston 5, and a valve chamber 6, connected by pipe 7 to auxiliary reservoir 8 and containing a main slide valve 9 and a graduating valve 10 mounted on and having a movement relative to the main slide valve, the brake cylinder 11 being connected by pipe 12 to passages 13 and 14 leading to the seat of slide valve 9.

According to my invention, communication from the brake pipe to the triple valve piston chamber 4 is controlled by a valve piston 15 adapted to seat upon movement in either direction and having one side open to brake pipe passage 2 and the opposite side connected to a passage 16 which leads to the seat of slide valve 9.

In operation of the construction as so far described, upon charging the brake pipe 3 with fluid under pressure, fluid flows through passage 2 to the outer face of valve piston 15 and shifts same to its inner seat, thereby opening a passage 17 leading from the outer face of the valve piston to the piston chamber 4. Fluid is therefore admitted from the brake pipe to piston chamber 4 and flows through the usual feed groove 18 around the triple valve piston 5 to valve chamber 6, charging the auxiliary reservoir 8 in the usual manner. The triple valve parts being in release position, as shown in the drawing, the brake cylinder is connected to the exhaust through passage 13, port 19 in slide valve 9, cavity 20 in graduating valve 10, and port 21 in slide valve 9, which is connected by a cavity extension 22 with exhaust port 23.

Upon a gradual reduction in brake pipe pressure, the triple valve piston 5 is shifted to service application position, engaging the spring stop 24, the service port 25 is uncovered by the movement of the graduating valve 10, and said port is caused to register with passage 13 by the movement of slide valve 9, so that fluid is supplied from the auxiliary reservoir 8 to brake cylinder 11 in the usual manner.

In addition, passage 16 is connected to the brake cylinder through port 26, port 27 extending from cavity 20 in the graduating valve 10, cavity 20, and port 28 to passage 14, so that in service position, the inner seated area of valve piston 15 is subject to brake cylinder pressure.

If, through gradual reductions in brake pipe pressure, the auxiliary reservoir pressure should equalize with the brake cylinder pressure, then a further gradual reduction in brake pipe pressure will result in a lower pressure in the brake pipe than the equalized brake cylinder pressure and consequently the higher brake cylinder pressure acting on the inner seated area of valve piston 15 in opposition to the lower brake pipe pressure acting on the opposite side will move the valve piston from its seat and since the full area thereof is then exposed to brake cylinder pressure, the same will be promptly shifted to its outer seat, closing the passage 17, so that fluid cannot pass from the triple valve piston chamber 4 to the brake pipe.

The fluid pressure in piston chamber 4 being bottled up, the triple valve piston 5 will not be shifted to emergency position, so that an emergency application of the brakes is prevented upon an over-reduction in brake pipe pressure, as will be evident. It is, however, desirable that when quick action is initiated, there will be a corresponding prompt response of the triple valve devices to effect an emergency application of the brakes, and for this purpose a second valve piston 29 is provided, having its inner seated area exposed to pressure in the piston chamber 4 and the outer face connected by a branch passage 30 with the brake pipe passage 2 and subject to the pressure of a spring 31.

When the brake pipe pressure has been suddenly reduced by the action of a vent valve device, or otherwise, the pressure in chamber 4, acting on the face of the valve piston 29, will overcome the reduced brake pipe pressure and the spring pressure acting on the opposite side and the valve piston will be lifted from its seat, exposing the full area to the pressure in chamber 4, so that the piston will be promptly shifted to its outer seat. Communication is then opened from passage 2 to the piston chamber 4, thus permitting a rapid reduction in pressure in said chamber, so that the triple valve piston 5 is shifted to emergency position, for effecting an emergency application of the brakes, and since the movement of the triple valve device to emergency position is substantially coincident with quick serial action produced by the vent valve, a corresponding quick serial action of the triple valve devices throughout the train is effected.

Having now described my invention, what I claim as new and desire to secure by Letters Patent is:—

1. In a fluid pressure brake, the combination with a brake pipe, auxiliary reservoir, brake cylinder, and a valve device operated by a gradual reduction in brake pipe pressure for supplying fluid from the auxiliary reservoir to the brake cylinder, of means operated upon a reduction in brake pipe pressure below the degree at which the auxiliary reservoir and brake cylinder equalize for preventing a further reduction of brake pipe pressure on said valve device.

2. In a fluid pressure brake, the combination with a brake pipe, auxiliary reservoir, brake cylinder, and a triple valve device having a piston operated upon a gradual reduction in brake pipe pressure for supplying fluid from the auxiliary reservoir to the brake cylinder, of means operated upon an over-reduction in brake pipe pressure for cutting off communication through which the brake pipe pressure in the triple valve piston chamber is reduced.

3. In a fluid pressure brake, the combination with a brake pipe, auxiliary reservoir, brake cylinder, and a triple valve device having a piston operated upon a gradual reduction in brake pipe pressure for supplying fluid from the auxiliary reservoir to the brake cylinder, of a valve piston subject to the opposing pressures of the brake pipe and the brake cylinder and operated upon a reduction in brake pipe pressure below the pressure in the brake cylinder for cutting off the venting of fluid from the triple valve piston chamber to the brake pipe.

4. In a fluid pressure brake, the combination with a brake pipe, auxiliary reservoir, brake cylinder, and a triple valve device comprising valve means and a piston operated upon a gradual reduction in brake pipe pressure for shifting said valve means to service application position to effect the supply of fluid from the auxiliary reservoir to the brake cylinder and a valve piston subject on one side to brake pipe pressure and having the opposite side connected to the brake cylinder upon movement of said valve means to service position for cutting off communication for venting fluid from the triple valve piston chamber to the brake pipe upon a reduction in brake pipe pressure below the equalizing point.

5. In a fluid pressure brake, the combination with a brake pipe, auxiliary reservoir, brake cylinder, and a valve device operated upon a gradual reduction in brake pipe pressure for supplying fluid from the auxiliary reservoir to the brake cylinder, of means operated upon an over-reduction in brake pipe pressure for cutting off communication for venting fluid from said valve device to the brake pipe and means operated upon a sudden reduction in brake pipe pressure for opening communication from the brake pipe to said valve device.

6. In a fluid pressure brake, the combination with a brake pipe, auxiliary reservoir, brake cylinder, and a valve device operated upon a gradual reduction in brake pipe pressure for supplying fluid from the auxiliary reservoir to the brake cylinder, of means operated upon a reduction in brake pipe pressure below the equalizing point for cutting off communication for venting fluid from said valve device to the brake pipe and means operated upon a sudden reduction in brake pipe pressure for opening communication from the brake pipe to said valve device.

In testimony whereof I hereunto set my hand.

WALTER V. TURNER.

Copies of this patent may be obtained for five cents each, by addressing the "Commissioner of Patents, Washington, D. C."